United States Patent [19]

Steinke

[11] 4,312,705

[45] Jan. 26, 1982

[54] SPACER FOR NUCLEAR REACTOR FUEL ASSEMBLIES

[75] Inventor: Alexander Steinke, Ebermannstadt, Fed. Rep. of Germany

[73] Assignee: Kraftwerk Union Aktiengesellschaft, Mulheim an der Ruhr, Fed. Rep. of Germany

[21] Appl. No.: 120,743

[22] Filed: Feb. 12, 1980

[30] Foreign Application Priority Data

Feb. 14, 1979 [DE] Fed. Rep. of Germany ....... 2905661

[51] Int. Cl.³ ............................................. G21C 3/30
[52] U.S. Cl. .................................... 376/441; 376/442
[58] Field of Search .................................. 176/76, 78

[56] References Cited

U.S. PATENT DOCUMENTS 3,674,635 7/1972 Anthony ............................. 176/78
3,890,196 6/1975 Chetter ............................... 176/78
3,904,475 9/1975 Tashima .............................. 176/78

Primary Examiner—Donald P. Walsh
Attorney, Agent, or Firm—Herbert L. Lerner; Laurence A. Greenberg

[57] ABSTRACT

Spacer for fuel rods assembled into a fuel assembly for nuclear reactors formed of a grid structure of sheet-metal webs passing edgewise perpendicularly through one another including resilient and rigid contact elements fastened to the sheetmetal webs, each of the fuel rods being supportable by two diagonally opposing three-point contact systems, each of the systems being formed of one of the resilient contact elements and two of the rigid contact elements, the one resilient contact element being centrally disposed, as viewed in axial direction, and the two rigid contact elements being oppositely disposed and being ring-shaped.

5 Claims, 9 Drawing Figures

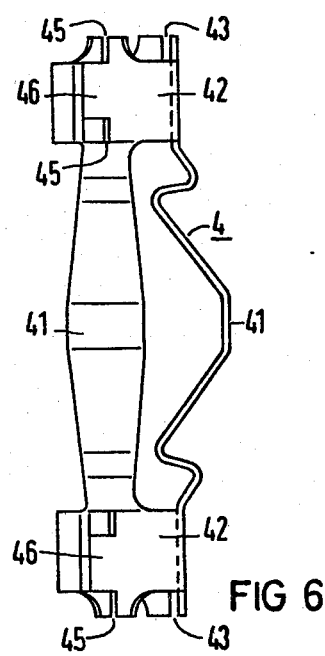
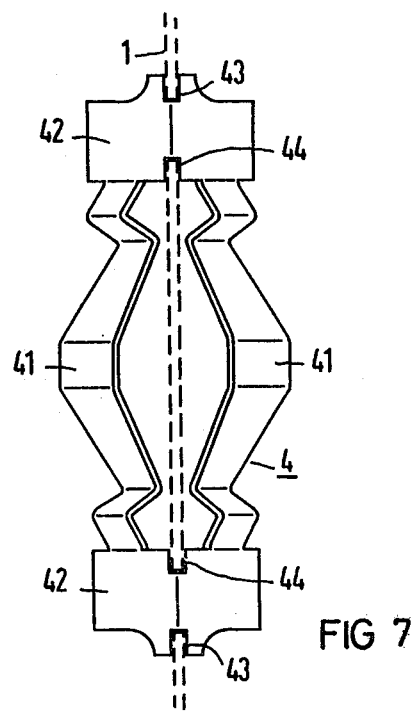
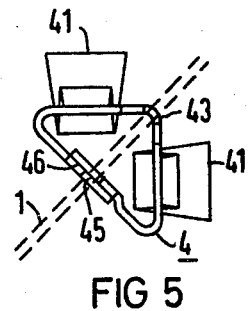
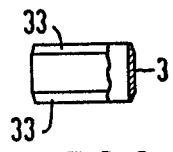
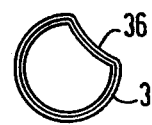
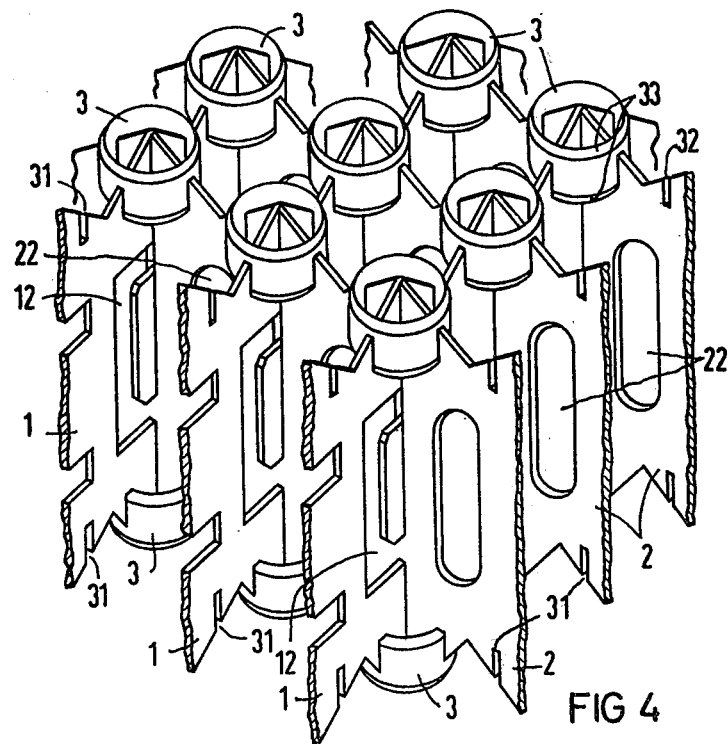

SPACER FOR NUCLEAR REACTOR FUEL ASSEMBLIES

The invention relates to a spacer for fuel rods assembled into a fuel assembly for nuclear reactors formed of a grid structure of sheetmetal webs passing edgewise perpendicularly through one another and having resilient and rigid contact elements fastened thereto.

A great number of constructions have become known heretofore for such spacers; in particular, reference may be had to German Pat. No. 1,589,051 wherein a so-called three-point support is proposed in which a fuel rod bears on one side against two rigid contact elements disposed one above the other and is pressed against them by a resilient contact element which engages the fuel rod on the opposite side thereof at half the height between the two rigid contact elements. Rigid and resilient contact elements are always thus located in the middle of the mesh walls of the spacer grid i.e. at the narrowest location between the fuel rod and the wall of the mesh, so that especially unfavorable cooling conditions prevail at this location. It has already been proposed heretofore also to place these contact elements in part at the intersection points of the spacer webs (note German Published Non-Prosecuted Application DE-OS Nos. 1 764 396 and 1 930 981). In these cases, the resilient contact elements, of themselves, form complete parts which are suspended into the web grid. The rigid contact elements, however, continue to remain at the narrowest location between the fuel rod and the wall of the mesh. This construction makes it possible to reduce the neutron absorption of such spacer grids with respect to previous constructions by making the web grid per se of a material having a low neutron absorption cross section, such as Zircaloy, for example, and only the spring contact elements per se of appropriately spring-hardened material, such as, Inconel, for example. The invention of the instant application is also based upon this principle.

The two last-mentioned proposals for spacer construction provide one spring contact element and four rigid contact elements for each spacer mesh. The rigid contact elements are located in the zone of the narrowest coolant gap and reduce heat removal by the coolant at these locations. It is further possible that, with these constructions, the fuel rod can be pushed out of the centered position thereof if strong lateral forces should occur, such as in the event of an earthquake, for example, and the fuel rod will then directly contact the wall of the mesh which, due to the degradation of the heat removal connected therewith, can lead to clodding tube defects.

It is accordingly an object of the invention to provide a spacer of the foregoing general type wherein cooling conditions are made more uniform over the entire circumference of the fuel rods at the height of the spacer grids and, at the same time, the pressure drop due to the latter is reduced. It is a further object of the invention to provide such a spacer wherein excursions of the fuel rods from the centered position thereof due to strong lateral forces are prevented as much as possible, while providing a construction of adequate strength with reduced material expenditure.

With the foregoing and other objects in view, there is provided, in accordance with the invention, a spacer for fuel rods assembled into a fuel assembly for nuclear reactors formed of a grid structure of sheetmetal webs passing edgewise perpendicularly through one another comprising resilient and rigid contact elements fastened to the sheetmetal webs, each of the fuel rods being supportable by two diagonally opposing three-point contact systems, each of the systems being formed of one of the resilient contact elements and two of the rigid contact elements, the one resilient contact element being centrally disposed, as viewed in axial direction, and the two rigid contact elements being oppositely disposed and being ring-shaped.

In accordance with another feature of the invention, the sheetmetal webs pass through one another at intersecting points and are formed with respective slots at the upper and lower edges thereof adjacent the intersecting points, the ring-shaped rigid contact elements being located at the intersecting points at the upper and lower edges of the sheetmetal webs and being engaged in the respective slots and welded to the sheetmetal webs, the ring-shaped rigid contact elements being formed of short tube sections having a diameter smaller than the diameter of the fuel rods to be supported in the spacer, at least the sheetmetal webs passing in the one direction through the other sheetmetal webs being formed with cutouts, members having a substantially triangular cross section respectively suspended in the cutouts and being held in position by the other sheetmetal webs, the members having two of the resilient contact elements extending in axial direction and projecting diagonally into two adjacent meshes of the grid structure.

In accordance with a further feature of the invention, the two resilient contact elements of the members, respectively, project laterally into the mesh beyond the respective ring-shaped rigid contact elements at the upper and lower edges of the sheetmetal webs so as to contact a respective fuel rod, whereas the ring-shaped rigid contact elements are spaced from the respective fuel rod.

In accordance with an additional feature of the invention, the grid structure has a multiplicity of meshes respectively defined by wall portions of the sheetmetal webs, the wall portions, respectively, being formed with large-area openings.

In accordance with a concomitant feature of the invention, the members suspended in the cutouts are formed of one-piece stamped-out blanks of resilient material having respective head and base parts formed by bends into a substantially triangular cross section, the head and base parts being formed with slots for guidance into cutouts and engaging a mesh wall forming part of the respective sheetmetal webs.

Other features which are considered as characteristic for the invention are set forth in the appended claims.

Although the invention is illustrated and described herein as embodied in a spacer for nuclear reactor fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a fragmentary perspective view, partly in section, of the spacer grid of FIG. 1;

FIG. 5 is an enlarged fragmentary view of FIG. 1 showing one of the resilient contact elements forming a part of the spacer grid;

FIGS. 6 and 7 are elevational views of FIG. 5 as seen, respectively, from a location above FIG. 5 and a location revolved clockwise through an angle of 45° therefrom; and FIGS. 8 and 9 are respective enlarged elevational and plan views of one of the rigid contact elements forming part of the spacer grid.

Figure 1:
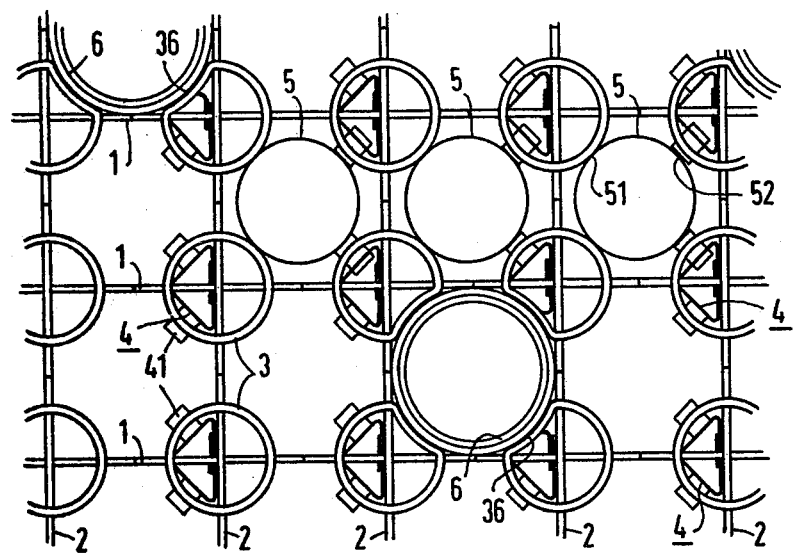
FIG. 1 is a fragmentary top plan view of a spacer grid constructed of sheetmetal webs in accordance with the invention.
Figure 2:
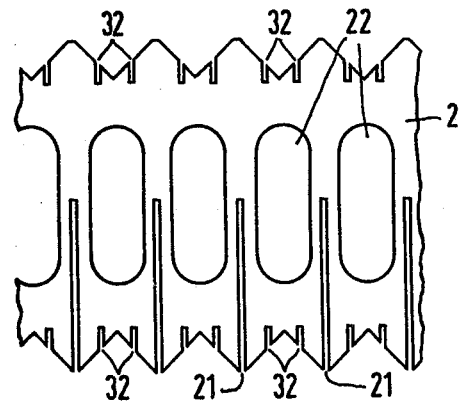
FIGS. 2 and 3 are fragmentary elevational views of one of the sheetmetal webs, respectively, disposed vertically and horizontally in FIG. 1.
Figure 3:
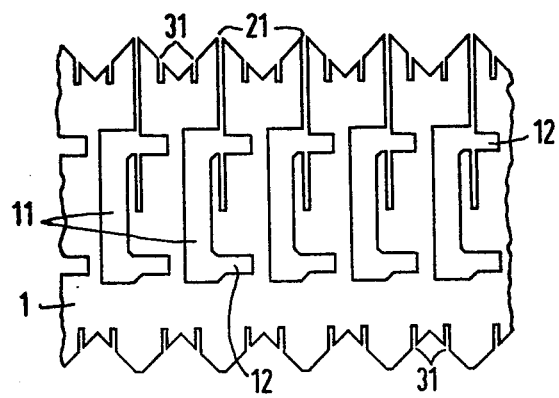

Referring now to the drawing and first, particularly, to FIGS. 1 to 3 thereof, there is shown a spacer grid according to the invention formed of sheetmetal webs 1 and 2. The spacer grid not only contains the fuel rods 5 but also, in a conventional manner, non-illustrated control rod guidetubes. The latter are insertable into sleeves 6 which are also shown in FIG. 1. Fixed contact elements are formed by ring-shaped tube sections 3 which are inserted into slots 32 and 31, respectively (see FIGS. 2 and 3) at the points of intersection of the webs 1 and 2. They are fastened there by welding; in addition, welded spots can also be provided at the points of intersection of these webs 1 and 2. As shown in FIG. 8, these fixed contact elements 3 are bevelled at the corners 33 thereof. This facilitates insertion thereof into the slots 31 and 32 and facilitates later insertion of fuel rods and guide tubes; furthermore, flow resistance to the coolant, which is normally water, is thereby reduced. The same purpose is served by the "arrow-shaped" construction of the webs 1 and 2 at the intersection points. Since the non-illustrated control rod guide tubes have a greater diameter than that of the fuel rods 5 and, therefore, also the receiving sleeves 6 therefor and the adjacent ring-shaped elements 3 are provided with indentations 36, as shown in FIG. 9 and, in addition, are welded at the locations of the indentations 36 to the sleeve 6 to hold the latter (note FIG. 1).

The resilient contact elements 4 are inserted into cutouts 12 formed in the web sheets 1 (see FIG. 3) and are held in this position by the subsequently inserted webs 2. A metallurgical joint is unnecessary. The construction thereof can be seen in detail from FIGS. 5, 6 and 7, wherein FIG. 6 is a side elevational view, FIG. 5 a corresponding top plan view and FIG. 7 a view of the contact element 4 in direction of the web sheet 1. It is apparent especially from FIG. 5 that this contact element 4 can be made by punching or stamping and bending out of a flat metal sheet in conventional manner. The two resilient parts 41 of the contact element 4, which can also be bent differently, of course, connect a head and a base piece 42 of triangular cross section. It is unnecessary to weld these end pieces 42 because short slots 45 are machined or worked into them and, like short slots 43 and 44 formed at the transversely opposed side of the contact element 4, embrace the wall of the web 1 (note FIG. 7) when the end pieces 42 are inserted into the cutout 12 (note FIG. 3) formed in the sheetmetal web 1 and are thereby themselves also held in the intended position thereof. As mentioned hereinbefore at the introduction hereto, these resilient contact elements 4 are made of materials, such as Inconel, for example. The remaining parts of the spacer grid, however, are formed of zirconium alloy. To reduce the expenditure of material further and, thereby, the neutron absorption as well as the pressure loss in the coolant flowing through, the mesh walls 1 and 2 of the spacer grid are furthermore formed with large-area openings 11 and 22.

As is evident from FIG. 1, the fuel rods 5, respectively, rest only against the rings 3 which are disposed opposite the resilient contact elements 4. However, a space remains between the fuel rods 5 and the rings 3 which are disposed above and below the spring elements 4. In this way, the respective three-point mounting is provided in each diagonal of a spacer mesh and, moreover, overstressing of the resilient parts 41, if strong lateral forces should occur, is avoided since then, further movement of the fuel rod 5 is prevented by the rings 3 which are fastened above and below the resilient contact elements 4. This meets the requirement for an earthquake-proof construction. As is also apparent from FIG. 1, it is no longer possible for the fuel rod 5 to break out of this mounting, in comparison with the proposals in the state of the art, so that also this is provided as security against lateral forces such as could occur, for instance, due to non-uniform thermal stressing or loading of the fuel rods 5.

It may also be seen from the foregoing that the cooling of the fuel rods 5 within the mesh is improved over the proposals in the state of the art since, at the narrowest locations between the fuel rods 5 and the web walls 1 and 2, no bumps or springs interfering with or hindering the flow are provided. Since, due to the geometrical relationships provided there, the flow cross section for the coolant is made more uniform, the behavior of the fuel rods 5 during thermal overloads is also considerably improved. This is achieved in particular also by providing for the coolant to be able to reach the continuously endangered points of a fuel rod just behind the corresponding contact points of the spacers in an unimpeded manner and in greater quantities. It then also follows (and detailed measurements have confirmed this), that the pressure losses are lower than in the spacer constructions which were heretofore conventional.

In addition to these functional improvements in spacer construction, the assembly of the thus-improved spacers is also relatively simple to effect. First, the resilient contact elements 4, completed in themselves, are inserted into the openings 11 formed in the sheetmetal webs 1 and slid into the cutouts 12 up to a stop. After all of the places for the resilient contact elements 4 are occupied, the webs 2 are inserted into the slots 21 formed in the webs 1 and surround the latter with the cutouts 22. Thereafter, the rings 3 are inserted on the upper and lower sides of the assembled spacer grid and are automatically fastened by welding. This is, of course, done with due regard being given to those meshes at which the sleeves 6 for the non-illustrated control rod guide tubes are inserted. The contact springs 41 projecting into the latter meshes are first removed from the contact elements 4.

A spacer for nuclear reactor fuel assembly which is so constructed is, of course, further held together in a conventional manner by an outer enveloping web. Furthermore, conventional coolant deflection vanes can also be provided for effecting improved turbulence of the coolant and thereby not only improve the cooling effect but also render the coolant outlet temperature more uniform.

I claim:

1. Spacer for fuel rods assembled into a fuel assembly for nuclear reactors formed of a grid structure of sheetmetal webs passing edgewise perpendicularly through one another comprising resilient and rigid contact elements fastened to the sheetmetal webs, each of the fuel rods being supportable in a respective mesh of the grid structure by two diagonally opposing three-point contact systems, each of said systems being formed of one of said resilient contact elements and two of said rigid contact elements disposed diagonally opposite and axially spaced from said one resilient contact elements, said one resilient contact element being disposed centrally of said two rigid contact elements, as viewed in axial direction, and said two rigid contact elements being disposed opposite one another in said axial direction and being ring-shaped.

2. Spacer according to claim 1 wherein the sheetmetal webs pass through one another at intersecting points and are formed with respective slots at the upper and lower edges thereof adjacent said intersecting points, said ring-shaped rigid contact elements being located at said intersecting points at the upper and lower edges of said sheetmetal webs and being engaged in the respective slots and welded to said sheetmetal webs, said ring-shaped rigid contact elements being formed of short tube sections having a diameter smaller than the diameter of the fuel rods to be supported in the spacer, at least the sheetmetal webs passing in the one direction through the other sheetmetal webs being formed with cutouts, members having a substantially triangular cross section respectively suspended in said cutouts and being held in position by the other sheetmetal webs, said members having two of said resilient contact elements extending in axial direction and projecting diagonally into two adjacent meshes of the grid structure.

3. Spacer according to claim 2 wherein said two resilient contact elements of said members, respectively, project laterally into the mesh beyond the respective ring-shaped rigid contact elements at the upper and lower edges of the sheetmetal webs so as to contact a respective fuel rod, whereas said ring-shaped rigid contact elements are spaced from the respective fuel rod.

4. Spacer according to claim 1 wherein the grid structure has a multiplicity of meshes respectively defined by wall portions of the sheetmetal webs, said wall portions, respectively, being formed with large-area openings.

5. Spacer according to claim 2 wherein said members suspended in said cutouts are formed of one-piece stamped-out blanks of resilient material having respective head and base parts formed by bends into a substantially triangular cross section, said head and base parts being formed with slots for guidance into said cutouts and engaging a mesh wall forming part of the respective sheetmetal webs.

* * * * *